United States Patent [19]
Katou et al.

[11] 3,909,696
[45] Sept. 30, 1975

[54] DC-DC CONVERTER

[75] Inventors: Kazuo Katou, Tokaimura; Yasuji Kamata, Hitachi, both of Japan

[73] Assignee: Hitachi, Ltd., Japan

[22] Filed: Dec. 26, 1973

[21] Appl. No.: 428,020

[30] Foreign Application Priority Data
Dec. 27, 1972  Japan.............................. 47-129981

[52] U.S. Cl...................... 321/2; 321/18; 321/45 R
[51] Int. Cl.².......................................... H02M 3/335
[58] Field of Search .......... 321/2, 18, 45 R; 323/17, 323/22 T, DIG. 1

[56]  References Cited
UNITED STATES PATENTS

| | | |
|---|---|---|
| 3,072,837 | 1/1963 | Hakimoglu............................ 321/18 |
| 3,523,235 | 8/1970 | Schaefer ................................. 321/2 |
| 3,586,957 | 6/1971 | Cass........................................ 321/2 |
| 3,663,944 | 5/1972 | Low et al............................. 321/2 X |
| 3,701,937 | 10/1972 | Combs..................................... 321/2 |
| 3,737,689 | 6/1973 | Schuerholz ........................ 321/2 X |
| 3,742,371 | 6/1973 | Seibt et al.............................. 321/2 |

Primary Examiner—A. D. Pellinen
Attorney, Agent, or Firm—Craig & Antonelli

[57] ABSTRACT

A DC-DC converter in which a series circuit of a switching element and an input winding of a transformer is connected to a DC power supply so that a desired output is produced from an output winding of the transformer by turning on and off the switching element.

7 Claims, 6 Drawing Figures

DC-DC CONVERTER

BACKGROUND OF THE INVENTION

1. Field of the Invention

This invention relates to a DC-DC converter which is automatically energized upon application thereto of an input voltage and capable of being reactuated after de-energization thereof on one hand and can be subjected to constant-voltage control on the other, and in particular to a DC-DC converter which eliminates the need for an insulated external auxiliary power supply.

2. Description of the Prior Art

The conventional converter of insulation type is such that a closed loop is formed by connecting an input winding of a transformer and a transistor in series with a DC power supply, so that a desired output is produced from an output winding of the transformer by on-off operation of the transistor caused by an output of a drive circuit.

In order to maintain at a desired fixed value the output voltage generated in the output winding of the transformer, such the drive circuit as mentioned above compares the output voltage of the output winding of the transformer, rectified and smoothed, with a predetermined reference voltage and changes the width of the driving pulse of the transistor to make the rectified and smoothed output voltage agree with the predetermined reference voltage. In this case, the drive circuit is actuated from an external insulated auxiliary power supply.

The provision of the auxiliary power supply, in spite of its advantage that the converter is automatically energized upon application thereto of a DC input voltage and can be reactuated even after the de-energization thereof, has a complicated circuit arrangement due to the requirement for insulation. Especially when the DC power supply involves a high voltage, an inverter which makes up a main component of the auxiliary power supply is required to employ a high-voltage element as the main circuit does, resulting in the bulkiness and high cost of the auxiliary power supply.

According to a comparatively simple conventional method using no auxiliary power supply, the rise portion of the applied DC voltage for energization is differentiated by a differentiating circuit and applied through a transformer to the base of a switching element as a trigger pulse. However, the converter does not effectively respond to a slow rise of the applied input voltage and also is incapable of being reactuated after being de-energized for some reason or other.

In another method which permits the automatic energization of the converter in response to a slowly rising input voltage as well as reactuation thereof without any external auxiliary power supply, a switching control section of a power converter, which corresponds to the aforementioned constant-voltage control section, of entirely self-oscillation type such as a blocking oscillator is used. When a plurality of parallel-connected converters are involved, however, it is difficult to achieve synchronism of their switching operations, thus making impossible extensive constant-voltage control of output voltages.

SUMMARY OF THE INVENTION

Accordingly, it is an object of this invention to provide a DC-DC converter which has a simple and compact power supply for the drive circuit for energizing a switching transistor and thus eliminates the external insulated auxiliary power supply required in some of the conventional converters.

Another object of the invention is to provide a DC-DC converter of which automatic and stable energization as well as easy reactuation is possible.

In order to achieve the above-mentioned objects, the converter according to this invention having a closed loop being formed by connecting series-connected input winding of a first transformer and switching element to a DC power supply in series so that a desired output is produced from an output winding of the first transformer by on-off operation of the switching element which is caused by a drive circuit having a second transformer is characterized in that, the converter further comprises an oscillation circuit for positively feeding an output of a feedback winding of the first transformer back to an input terminal of the switching element and a rectification circuit for rectifying an oscillation output with a small duty ratio produced from the first transformer, the rectification circuit producing an output to be used as an operating voltage for the drive circuit.

DESCRIPTION OF THE PREFERRED EMBODIMENTS

Figure 1:
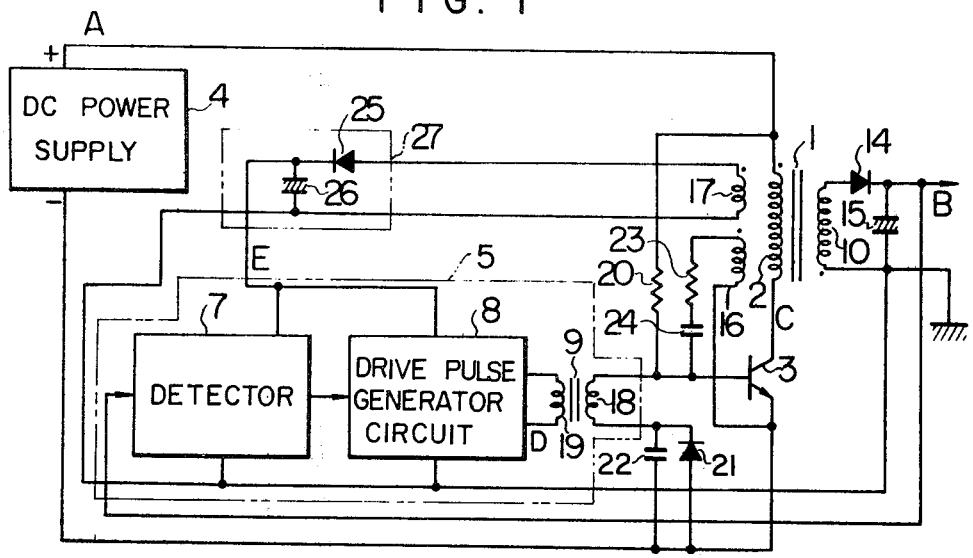
FIG. 1 is a circuit diagram showing an embodiment of the DC-DC converter according to the present invention.

Referring to FIG. 1 showing a circuit diagram of an embodiment of the invention, an input winding 2 of a first transformer 1 and a transistor 3 that is a switching element constitute a series circuit which is connected in series with a DC power supply 4 thereby to form a closed loop, while a desired output is produced from an output winding 10 by turning on and off the transistor 3 by means of outputs from a drive circuit 5 which includes a detector circuit 7, a drive pulse generator circuit 8 and a second transformer 9. The output from the output winding 10 of the first transformer 1 is rectified and smoothed by a diode 14 and a capacitor 15 and applied to the detector circuit 7 where it is compared with a predetermined level of voltage to detect the deviation therefrom. The resulting deviation is applied to the drive pulse generator circuit 8 for generating an output with a pulse width corresponding to the value of the deviation, so that the output from the drive pulse generator circuit 8 is applied through the second transformer 9 to the input terminal of the transistor 3, thus maintaining the output voltage of the first transformer at a desired fixed level.

The main circuit comprising the first transformer 1, transistors 3 and DC power supply 4 is a converter of flyback mode, in which the input winding 2, an output winding 10, a feedback winding 16 and an auxiliary winding 17 are wound on the first transformer 1, the input winding 2 being connected in series with the DC power supply through the transistor 3. The base of the transistor 3 which is connected with an output winding 18 of the transformer 9 of the drive circuit 5 as well as with the power supply through a resistor 20 of high resistance is supplied with a small forward bias voltage. An end of the output winding 18 of the second transformer 9 is connected, through a parallel circuit of a diode 21 and a capacitor 22, to the emitter of the transistor 3, so that the output of the drive circuit 5 presents a high impedance against the DC bias due to the high-valued resistor 20 and a low impedance against AC drive pulses. Further, the base of the transistor 3 is connected to the feedback winding 16 through the differentiating circuit comprising a resistor 23 and a capacitor 24. The auxiliary winding 17 is connected, through a rectification circuit 27 comprising a diode 25 and a capacitor 26, to the detector circuit 7 and the drive pulse generator circuit 8 for actuating the same. The rectified and smoothed output voltage of the output winding 10 is fed back to the detector circuit 7.

The operation of the embodiment shown in FIG. 1 will be explained below with reference to the time chart of FIG. 2.

Waveforms A, B, C, D and E show the respective voltage waveforms when detected at points denoted by like symbols in FIG. 1. Symbol F shows an initial energization period, G a period of constant-voltage control and H a period during which the output of the transformer 1 is short-circuited.

Figure 2:
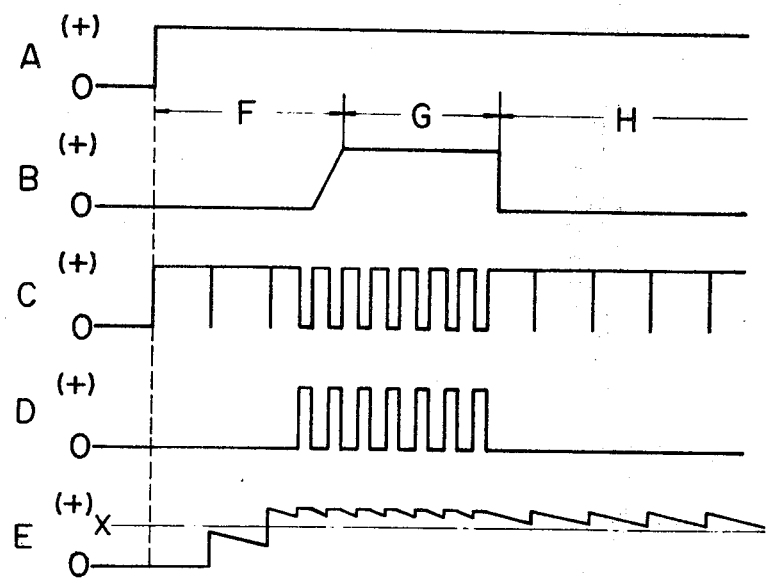
FIG. 2 is a time chart for explaining the operation of the embodiment shown in FIG. 1.

Upon application of an input voltage as shown in A of FIG. 2 to the circuit from the power supply 4, a base current flows in the transistor 3 through a resistor 20 thereby causing the transistor 3 to conduct as shown in C of FIG. 2. Under this condition, the windings of the transformer 1 of such polarities as indicated by black dots and therefore a voltage to be positively fed back is generated in the feedback winding 16, so that a differentiated current flows to the base of the transistor 3 through the differentiating circuit comprising the resistor 23 and capacitor 24 thereby to complete the conduction of the transistor 3. The increase of the collector current of the transistor 3 follows a straight line due to an inductive load until the time point when the increase in the collector current is blocked by the small base current due to the resistor 20, the resistor 23 and the capacitor 24, thereby quickly cutting off the transistor 3 with the help of the voltage across the feedback winding 16. When the transistor 3 is cut off, the base voltage of the transistor 3 becomes negative due to the voltage across the winding 16, and this cut-off state continues until the base voltage is turned to positive state due to the charging circuit comprising the resistor 20 and the capacitor 22. In other words, the circuit is subjected to a blocking oscillation with low coupling factor during the initial energization period as shown by F of FIG. 2. The duty ratio based on this blocking oscillation is, for the reason mentioned later, required to be lower than the minimum duty ratio for the oscillation caused by separate excitation through the transformer 9, and this is achieved by maintaining the blocking oscillation frequency at a sufficiently low level.

The pulse waveform induced in the auxiliary winding 17 by the blocking oscillation is rectified by the rectifier circuit 27 comprising the diode 25 and the capacitor 26 surrounded by a dashed line and applied as trigger pulses as shown in E of FIG. 2 to the detector circuit 7 and the drive pulse generator circuit 8. Thus the application of an input power causes the blocking oscillation which puts the detector circuit 7 in a condition where it is capable of detecting the deviation of the output voltage from the predetermined value, so that an internal oscillator of the drive pulse generator circuit 8 is energized thereby to generate an output with a pulse width corresponding to the deviation. The output voltage is fed back to the detector circuit 7 from the negative feedback circuit on the output side of the transformer 1, with the result that the constant-voltage control as indicated by the period G in FIG. 2 is effected to maintain the output voltage at desired level.

Transition from the initial energization state to the normal constant-voltage control is made swiftly in response to the charging of the capacitor 26 of the rectifier circuit 27, the operation for the transition being very stable because the output of the auxiliary power supply dependent solely on the source voltage undergoes substantially no change during the transition period.

It will be seen that according to the invention the pulse width of outputs due to the blocking oscillation is shorter than that of the drive pulse for normal constant-voltage control so far as the peak-value rectification is possible, while the period of a cycle thereof is sufficiently long. When the driving frequency of 20KHz is involved, for example, the blocking frequency is several KHz or less while the pulse width is several microseconds or less. In such a case, the synchronism in the blocking oscillation can be achieved without any interference during the normal constant-voltage control partly due to its low coupling factor. Also, the blocking oscillation is easily started when the constant-voltage output is under a light load or when the drooping outputs are controlled by short control pulses during the short-circuiting. Also, the heavy load that may be involved in the blocking oscillation is substantially reduced thereby to facilitate the energization. Thus the auxiliary voltage which is always secured as if an insulated auxiliary power supply is separately provided can be disregarded actually from the viewpoint of control operation and power capacity. By the way, the time period H shows that the auxiliary power can be secured as shown by E even if the output side of the transformer 1 is short-circuited.

Figure 3:
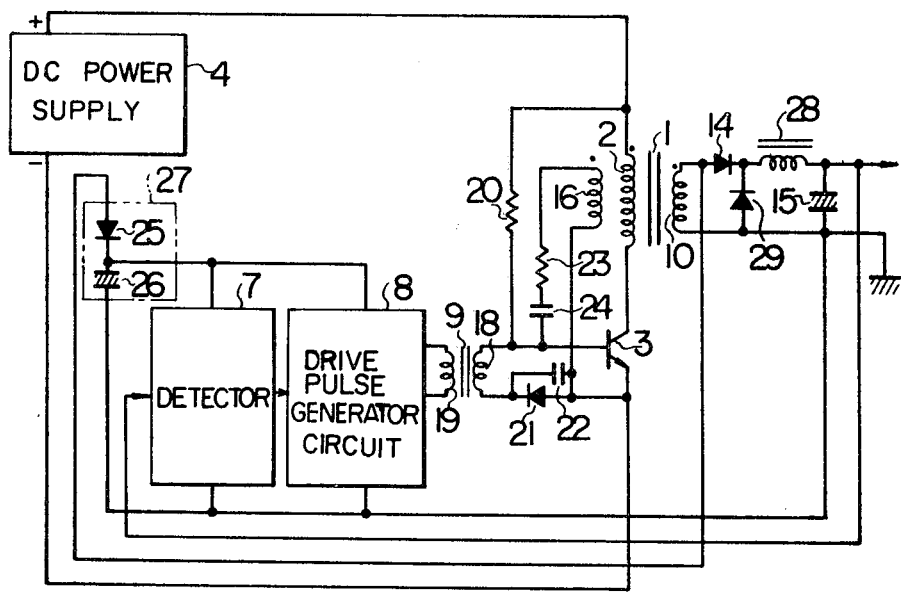
FIG. 3 is a circuit diagram of another embodiment of a DC-DC converter including a transformer in trans-mode.

FIG. 3 shows a circuit diagram illustrating an embodiment of the invention as it is applied to a converter of transmode. In the drawing, reference numeral 28 shows smoothing inductance and numeral 29 a flywheel diode. Like reference numerals in FIGS. 3, 4, 5 and 6 show component elements shown by like numerals in FIG. 1.

Because of the transmode, the input winding 2 of the first transformer 1 is in the same polarity as the output winding 10 and therefore it is possible to make the output winding 10 double as the auxiliary winding 17 in FIG. 1, thereby eliminating the provision of an auxiliary winding for the first transformer.

Figure 4:
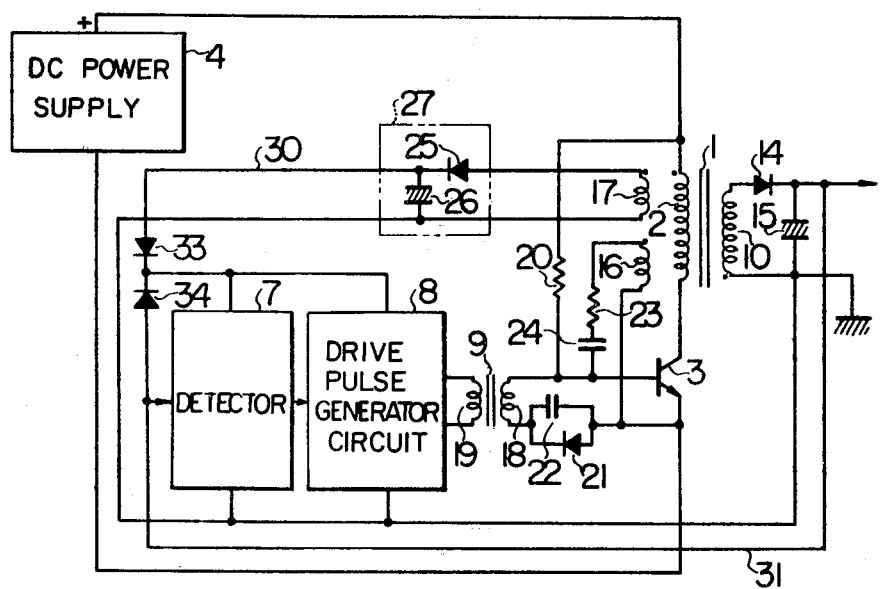
FIG. 4 is a circuit diagram of another embodiment of a DC-DC converter including a transformer in fly-back mode.

Still another embodiment of the invention is shown in FIG. 4, which is intended to obtain a compact peak-value rectifier circuit 27. The output 30 of a peak-value rectifier circuit 27 and the output 31 of a smoothing capacitor 15 are connected to a detector circuit 7 and a drive pulse generating circuit 8 respectively through diodes 33 and 34, so that by setting the output voltage of the peak-value rectifier circuit 27 at a lower level than that of the smoothing capacitor 15, operating voltages for the detector circuit 7 and drive pulse generating circuit 8 are obtained from the peak-value rectifier circuit 27 for the starting of operation, while operating voltages are introduced from the smoothing capacitor 15 during the normal operation.

As a result, the voltage applied from the auxiliary winding 17 to the peak-value rectifier circuit 27 is required to be an instantaneous rated value, thereby permitting the reduction of circuit elements to a small capacity and a compact circuit arrangement.

Figure 5:
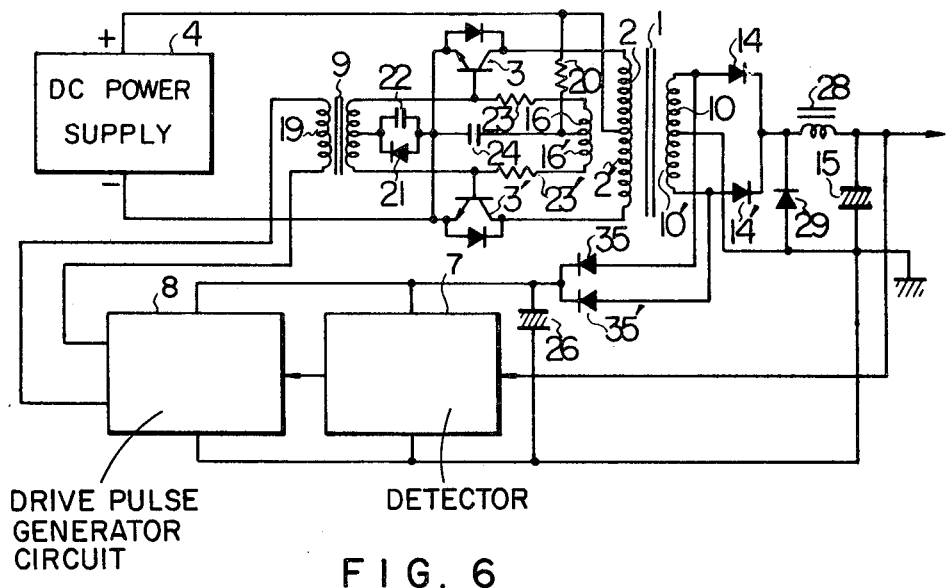
FIG. 5 is a circuit diagram of another embodiment of a DC-DC converter including a transformer of the push-pull type.

A further embodiment of the invention is shown by the circuit diagram of FIG. 5 illustrating a push-pull converter of transmode intended to be applied to large-capacity converters.

The shown converter is of push-pull type with two switching elements and produces a larger output than the converters shown in FIGS. 1, 3 and 4 each having one switching element.

Also, the fact that positive and negative portions of the AC output waveform produced from the first transformer 1 are symmetric with respect to each other, permits the converter to be used also as an inverter for rectangular wave outputs, the AC outputs being produced from the output windings 10 and 10'.

As to the operation of the embodiment under consideration, the application of a signal from the DC power supply 4 causes a small amount of bias current to flow into the base of the transistors 3 and 3' through low-valued resistors 23 and 23'. One of the transistors 3 and 3' begins to conduct, so that a positive feedback voltage is generated in the feedback windings 16 and 16' thereby to make the transistors 3 and 3' conduct in full. This conduction period is comparatively short and proportional to the time constant due to the resistors 23 and 23'.

Following a comparatively long period proportional to the time constant due to the resistor 20 and the capacitor 22, the other transistor 3' conducts, thereby producing narrow pulses 10 and 10' from the output windings 10 and 10'. These output pulses are rectified by diodes 35 and 35' and stored in the capacitor 26.

As a result, the detector circuit 7 and drive pulse generator circuit 8 of the drive circuit are energized to achieve negative feedback control in such a manner as to maintain the output voltage at a predetermined level as mentioned already. When the normal operating condition is thus reached, the transistors 3 and 3' are energized by pulse outputs of the drive pulse generator circuit 7 through the second transformer 9. This embodiment is suitable for applications such as converters of larger capacity than that shown in FIG. 2.

Figure 6:
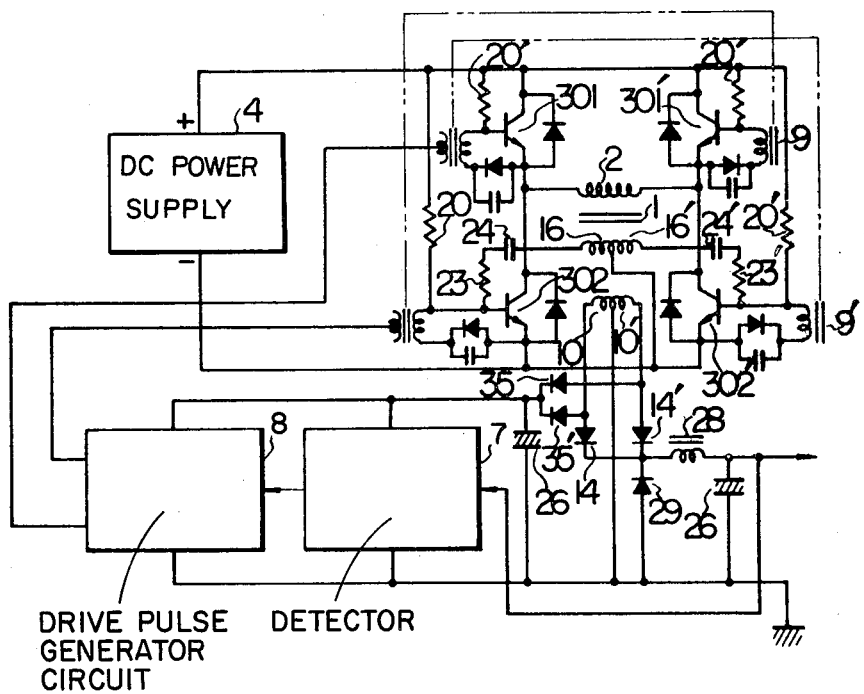
FIG. 6 is a circuit diagram of a further embodiment of a DC-DC converter including a transformer of the bridge type.

FIG. 6 illustrates a circuit diagram of an even further embodiment of the invention as it is applied to the converter of bridge type.

This converter of bridge type is suitable for high-voltage large-capacity applications and has the advantages of low breakdown voltage and high working efficiency.

In this converter of bridge type it is required that transistor pairs 301, 302'; and 302, 301', each in diagonally opposed relationship, be alternately energized both during the initial energization period and subsequent normal operation.

Referring to FIG. 6, high-valued biasing resistors 20 and 20' are provided for each transistor, so that any of them may be first energized by a signal from the DC power supply 4. In view of the fact that the output windings 10 and 10' have opposite polarities and the transformers 9 and 9' are identical in polarity with the transistor groups of diagonally opposed 302, 301'; and 302', 301 respectively, for example, the alternate energization of the two transistor pairs is assured during both initial energization period and normal operation, even if one of the transistors is biased stronger than the other. The other aspects of the operations are quite the same as those in the embodiment of FIG. 5.

The embodiment under consideration can also be used as an inverter, in which case an AC output is obtained from the output windings 10 and 10'.

Even though the above explanation of all the embodiments is concerned with constant-voltage regulation, the invention may be applied with equal effect to constant current regulation by feeding back variations in current instead of voltage.

We claim:

1. A DC-DC converter comprising:
   a first transformer including an input winding, an output winding, and a feedback winding;
   a switching element for selectively connecting and disconnecting said input winding of said first transformer to a DC power supply;
   a drive circuit including a second transformer which is connected to an input of said switching element to cause said switching element to effect on-off operation thereby to produce a desired output from said output winding of said first transformer;
   a high impedance element connected between said DC power supply and said input terminal of said switching element;
   an oscillation circuit for positively feeding back an output of said feedback winding of said transformer to said input terminal of said switching element to generate an oscillation to produce pulses with such a small duty ratio that the average value of the output voltage derived from said output winding of said first transformer due to the pulses is substantially zero; and
   a rectifier circuit for rectifying an output voltage derived from said first transformer and for holding the rectified peak voltage to apply the rectified peak voltage to said drive circuit as an operating power source for said drive circuit.

2. A DC-DC converter according to claim 1, in which said first transformer is provided with an auxiliary winding in the same polarity as the input winding thereof so that the output from said auxiliary winding is applied to said rectifier circuit so as to be rectified.

3. A DC-DC converter according to claim 1, in which said input and output windings of said first transformer are arranged in the same polarity with each other so that the output from said output winding of said first transformer is applied to said rectifier circuit so as to be rectified.

4. A DC-DC converter having a first transformer, a switching element connected in series with an input winding of said first transformer, a DC power supply connected to the series circuit of said input winding of said first transformer and said switching element to make up a closed loop, a drive circuit including a second transformer for rendering said switching element to be turned on and off thereby to produce a desired output from an output winding of said first transformer, in which said converter further comprises an oscillation circuit for positively feeding back an output of a feedback winding of said first transformer to an input terminal of said switching element; a first rectifier circuit for rectifying an output voltage with a low duty ratio produced from an auxiliary winding of said first transformer to produce a first rectified voltage, said auxiliary winding being arranged in the same polarity as the input winding of said first transformer; means for applying said first rectified voltage to said drive circuit, said first rectified voltage being used as a first operating voltage for said drive circuit during the initial energization period; a second rectifier circuit for rectifying the output voltage from said output winding of said first transformer to produce a second rectified voltage; means for applying said second rectified voltage to said drive circuit, said second rectified voltage being used as a second operating voltage for said drive circuit during the normal operating period.

5. A DC-DC converter comprising a first transformer including an input winding, an output winding, and a feedback winding, a pair of switching elements connected to the end terminals of the input winding of said first transformer respectively, a DC power supply connected to the center point of said input winding of said first transformer, a drive circuit including a second transformer which is connected to an input of said switching elements to cause said switching elements to effect on-off operation so that the electric power from said DC power supply is converted into an AC power by the push-pull operation of said switching elements, an oscillation circuit for positively feeding back an output from the feedback winding of said first transformer to the input terminal of said switching elements to generate an oscillation to produce pulses with such a small duty ratio that the average value of the output voltage derived from said output winding of said first transformer is substantially zero, and a rectifier circuit for rectifying an output voltage derived from said first transformer and for holding the rectified peak voltage to apply the rectified peak voltage to the drive circuit as an operating power source for said drive circuit.

6. A bridge type DC-DC converter comprising first and second switch means each including a pair of series-connected switching elements, said first and second switch means being connected in parallel with each other, a DC power supply connected in series with said respective two switch means, a first transformer including an input winding, an output winding, and a feedback winding, said first transformer being inserted between said two switch means in a manner so that one end of an input winding of said first transformer being connected to a junction point of the pair of switching elements of said first switch means, the other end of the input winding of said first transformer being connected to a junction of the pair of switching elements of said second switch means, a drive circuit including a second transformer which is connected to an input of said switching elements to cause said switching elements to effect on-off operation, an oscillation circuit for feeding back the output from the feedback winding of said first transformer to the input terminal of said switching elements to generate an oscillation to produce pulses with such a small duty ratio that the average value of the output voltage derived from the output winding of said first transformer due to the pulses is substantially zero, and a rectifier circuit for rectifying an output voltage derived from said first transformer and for holding the rectified peak voltage to apply the rectified peak voltage to said drive circuit as an operating power source for said drive circuit.

7. A DC-DC converter comprising a first transformer including an input winding, an output winding, a feedback winding and an auxiliary winding separate from the output winding, a switching element connected in series with the input winding of said first transformer, a DC power supply connected to the series circuit of said first transformer and said switching element to make up a closed loop, a drive circuit including a second transformer for causing said switching element to effect on-off operation so as to produce a desired output from the output winding of said first transformer, an oscillation circuit for positively feeding back the output from the feedback winding of said first transformer to an input terminal of said switching element, and a rectifier circuit for rectifying the output voltage derived from the auxiliary winding of said first transformer and for applying the rectified voltage as an operating voltage for said drive circuit.

* * * * *